(12) United States Patent
Adam et al.

(10) Patent No.: US 10,176,182 B2
(45) Date of Patent: Jan. 8, 2019

(54) FILE DELETION IN STORAGE DEVICES BASED ON THE DELETION PRIORITY RULES

(71) Applicant: International Business Machines Corporation, Armonk, NY (US)

(72) Inventors: Constantin M. Adam, Norwalk, CT (US); John J. Rofrano, Mahopac, NY (US); Shang Q. Guo, Cortlandt Manor, NY (US); Frederick Y.-F. Wu, Greenwich, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 14/840,911

(22) Filed: Aug. 31, 2015

(65) Prior Publication Data

US 2017/0060886 A1  Mar. 2, 2017

(51) Int. Cl.
    *G06F 17/30* (2006.01)
(52) U.S. Cl.
    CPC .... *G06F 17/30085* (2013.01); *G06F 17/3051* (2013.01); *G06F 17/30117* (2013.01); *G06F 17/30082* (2013.01)
(58) Field of Classification Search
    CPC ......... G06F 17/30082; G06F 17/30085; G06F 17/301; G06F 17/30115; G06F 17/30117; G06F 17/30507; G06F 17/3051
    See application file for complete search history.

(56) References Cited

U.S. PATENT DOCUMENTS

| 5,983,241 A | 11/1999 | Hoshino |
| 8,812,563 B2 | 8/2014 | Zaitsev |
| 8,927,023 B2 | 1/2015 | Burman et al. |
| 2002/0133491 A1* | 9/2002 | Sim .................. G06F 17/30067 |
| 2006/0136446 A1* | 6/2006 | Hughes ............. G06F 17/30067 |
| 2007/0288861 A1* | 12/2007 | Tabellion ............ G06F 17/3007 |
| | | 715/783 |
| 2010/0332401 A1* | 12/2010 | Prahlad ............. G06F 17/30082 |
| | | 705/80 |
| 2013/0054536 A1* | 2/2013 | Sengupta .......... G06F 17/30289 |
| | | 707/654 |

(Continued)

FOREIGN PATENT DOCUMENTS

EP  2363815 A1  9/2011

OTHER PUBLICATIONS

Leonard, O. C., et al., "The Design and Implementation of Elastic Quotas: A System for Flexible File System Management", Columbia University Technical Report CUCS-014-02, Jun. 2002, 14 pages.

*Primary Examiner* — Mark D Featherstone
*Assistant Examiner* — Diedra McQuitery
(74) *Attorney, Agent, or Firm* — Scully, Scott, Murphy & Presser, P.C.; Kurt P. Goudy, Esq.

(57) ABSTRACT

Deleting files may include identifying files stored in a storage device to delete based on one or more deletion rules. The identified files are categorized into at least a first group and a second group. Deletion of files may be triggered based on a free space threshold. Deletion of files in the first group may be triggered. If the free space threshold is not met by deleting the files in the first group, deletion of files in the second group is triggered based on one or more of prioritization and cost optimization.

16 Claims, 3 Drawing Sheets

(56) References Cited

U.S. PATENT DOCUMENTS

| | | |
|---|---|---|
| 2014/0074897 A1 | 3/2014 | Morita |
| 2015/0199366 A1* | 7/2015 | Marlatt ............ G06F 17/30085 |
| | | 707/823 |

* cited by examiner

FILE DELETION IN STORAGE DEVICES BASED ON THE DELETION PRIORITY RULES

FIELD

The present application relates generally to computers and more particularly to deleting files in a storage device of a computer system or device.

BACKGROUND

Computing devices are typically equipped with memory or storage devices that store data or files. As data or files are added, the memory space becomes full. Data or files need to be removed or moved to make more room available in a storage device. System administrators or the like set up the deletion rules to cleanup files from managed servers periodically. The deletion rules specify the files to be identified for deletion using the file properties.

Generally, there are two groups of files. Group 1 includes files that will no longer be needed. Group 2 includes files that may have a chance to be used. For user's convenience, these files are kept available as long as possible. Existing solutions treat group 1 and group 2 equally.

The present disclosure in one aspect describes an improvement to deletion solution by providing elastic deletion mechanism so that files in group 2 will be kept as long as possible without sacrificing managed server operation performance.

BRIEF SUMMARY

A system and computer-implemented method of deleting files may be provided. The method, one aspect, may include identifying files stored in a storage device to delete based on one or more deletion rules. The method may also include categorizing the identified files into at least a first group and a second group. The method may further include triggering deletion of files based on a free space threshold. Triggering the deletion of files may include triggering deletion of files in the first group, determining whether the free space threshold is met by deleting the files in the first group, and responsive to determining that the free space threshold is not met by deleting the files in the first group, triggering deletion of files in the second group based on one or more of prioritization and cost optimization.

A system for deleting files, in one aspect, may include a storage device and one or more processors operable to identify files stored in the storage device to delete based on one or more deletion rules. One or more of the processors may be further operable to categorize the identified files into at least a first group and a second group. One or more of the processors may be further operable to trigger deletion of files based on a free space threshold, wherein one or more of the processors triggers deletion of files by triggering deletion of files in the first group, determining whether the free space threshold is met by deleting the files in the first group, and responsive to determining that the free space threshold is not met by deleting the files in the first group, triggering deletion of files in the second group based on one or more of prioritization and cost optimization.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
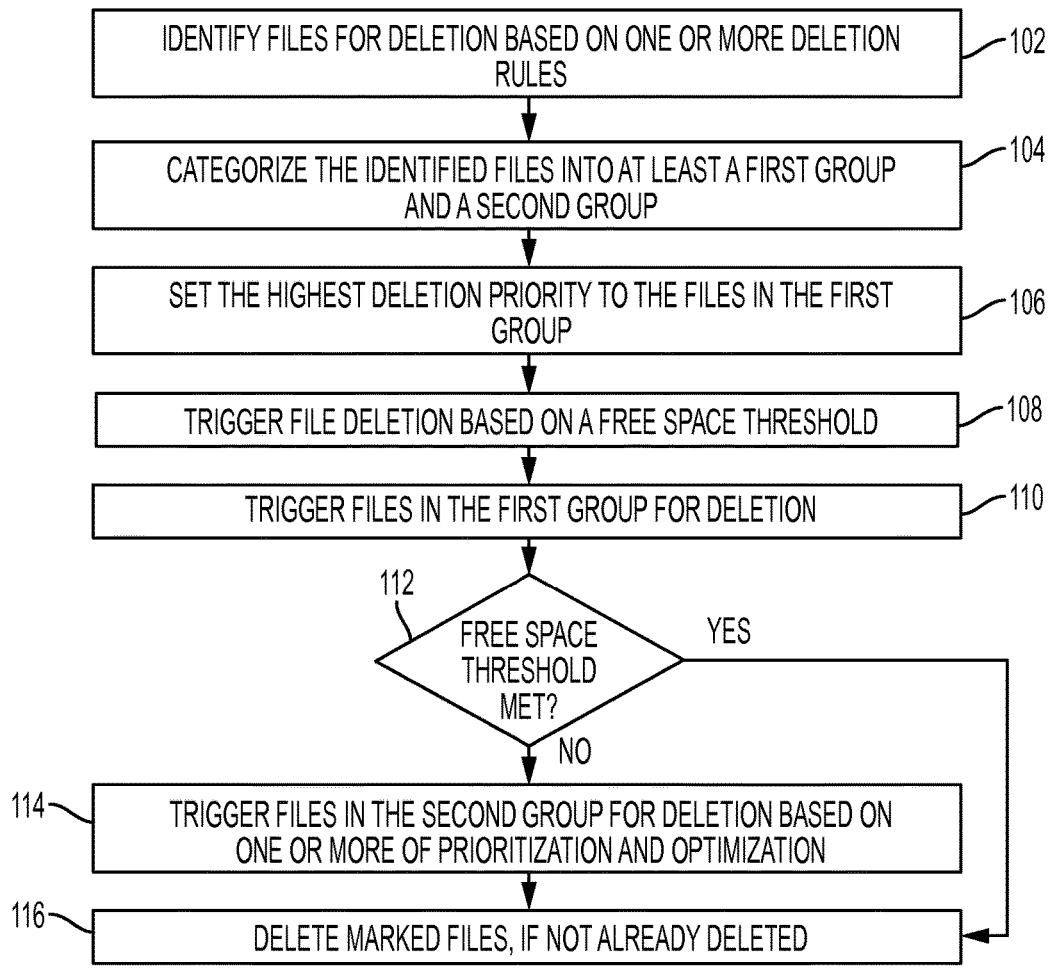
FIG. 1 is a method of deleting files, for example, to free memory space of a memory device in one embodiment of the present disclosure.

A system and/or method of the present disclosure in one embodiment may identify files to delete based on deletion rules and categorize them into a plurality of groups, e.g., group 1 and group 2, or in finer granularity groups. The system and/or method in one embodiment may set the highest deletion priority to the files in group 1. Files in group 2 may be deleted based on prioritization, cost minimization or the combination of prioritization and cost minimization.

In one embodiment, file deletion may be triggered based on a free space threshold and files in group 1 and group 2 may be deleted until the free space threshold is reached. The free space threshold refers to the additional free space required in order for a managed server or computing device to perform properly. The mechanism or methodology of the present disclosure may be used to maintain a needed free memory space or storage space for a device to function. For instance, the mechanism or methodology of the present disclosure may used in file deletion for a computer server or any other computer device, a smart phone, or individual application such as an electronic mail (email) program. In one aspect, the threshold may be determined based on different factors, e.g., the server type, random access memory (RAM) size, hard disk space and deployed applications.

As an example, consider a computer server with the total free space of 10 gigabytes (GB) on a storage device, and that the server requires another 4 GB (free space threshold) in order to work properly. Consider also that the total space of the identified files in group 1 is 2 GB and the total space of files in group 2 is 5 GB. In one embodiment, the system and/or method of the present disclosure may delete all files in group 1 to free 2 GB of storage memory, but only delete partial files in group 2 to free 2 GB of storage memory to meet the free space threshold. In one embodiment, the system and/or method of the present disclosure selects files in group 2 to delete based on the priority or cost-minimization algorithm until the free space threshold 4 GB (2 GB from group 1, 2 GB from group 2) is reached.

The system and/or method of the present disclosure in one embodiment provide for an elastic file deletion mechanism in which the files are kept in group 2 as long as possible without sacrificing the managed server operation performance. The deletion priority may be determined for files in group 2 based on one or more of file properties, categories, and dependencies. Other factors may be utilized. In one embodiment, the probability that a file in group 2 will be used in the next number of days, e.g., the next 30 days, may be determined and the cost for the file retrieval due to deletion may be estimated. The system and/or method of the present disclosure in one embodiment identify files to delete based on the deletion priority and/or cost optimization.

FIG. 1 is a method of deleting files, e.g., to free a memory space of a storage device in one embodiment of the present disclosure. The method may be performed to free memory space in a persistent memory device.

At 102, files are identified for deletion based on one or more deletion rules. For example, whenever the file state is changed (e.g., a new file is created, an existing file is changed), the process for identifying a file and marking the file for deletion may be trigger. In another aspect, identifying of files may be triggered as part of a periodic checking; For example, a system administrator or the like may schedule such checks on a computer system and associated storage devices.

Deletion priority rules may include the following in one embodiment of the present disclosure:

For the same name type (e.g., same extension name), older files are deleted first, for example, the older file is set with a higher priority for deletion.

For the same name type and same age, larger files are deleted first, for example, the larger file is set with a higher priority for deletion.

For the files in the same tag or belonging to the same category, the same deletion priority is assigned to those files.

For the files in the same dependency tree, the same priority is assigned to the file and its dependents, for example, similar to cascade deletion in database management.

For the files accessed recently, e.g., by determining the file property of last access date, the priority for deletion is lowered based on one or more deletion rules. For instance, if a rule specifies that files in "tmp" directory older than x days (e.g., 10 days) should be deleted, and files A and B both meet this criteria but file A was accessed more recently (e.g., so that file A has more chance to be accessed again than file B), file A's priority in deletion may be set lower than that of file B.

For the files which have multiple copies, or versions, only the latest version or one copy may be kept. The highest deletion priority is set to other copies and versions. At the same time, a file mapping may be created so the content can be retrieved from one copy in the local server via the file mapping.

One file may get several different priorities, for example, based on the above rules. In this case, the file is assigned the lowest deletion priority.

In the above description, as an example, the files with higher deletion priorities get deleted before those with lower deletion priorities.

At 104, the identified files are categorized into at least a first group and a second group. Whether to categorize a file into the first group or the second group may be determined according to one or more criteria, for example, set by a system administrator or the like, or defined in one or more deletion rules.

At 106, the highest deletion priority is set to the files in the first group.

At 108, file deletion is triggered based on a free space threshold. The free space threshold refers to additional free space needed in the storage device for a computer or another device coupled to the storage device to function. The free space threshold value may be determined based on a type of the computer device, e.g., a server, mobile device, or another device, and size of a memory coupled such a device (e.g., RAM size), number and size of applications installed and/or running on such a device, hard disk space (e.g., persistent memory) coupled to such a device. For instance, if the free space threshold is greater than 0, file deletion is triggered, in which files are deleted.

At 110, files in the first group are triggered for deletion. Triggering for deletion may include deleting those files. In another aspect, triggering for deletion may include marking the files for deletion, wherein all files marked for deletion may be deleted in a batch mode at a later time when all of the files (e.g., those in other groups) have been identified and marked for deletion.

At 112, it is determined whether the free space threshold is reached by deleting the files in the first group. If so, only the files in the first group are deleted or marked for deletion. For instance, no other files are deleted in this iteration of the processing logic since the free space threshold is met. If the free space threshold is not reached by removing the files in the first group, the processing logic proceeds to 114.

At 114, files in the second group are triggered for deletion. Triggering for deletion may include deleting those files identified in the second group for deletion. In another aspect, triggering for deletion may include marking those files for deletion, wherein the marked files may be deleted in a batch mode with all other files that have been marked for deletion. In one embodiment, tile deletion at 114 of the second group of files is based on prioritization or cost optimization (e.g., resource optimization), or the combination of prioritization and cost optimization. Deletion priority of the files in the second group is set based on one or more of deletion priority rules and cost optimization. The deletion priority rules include those described above with reference to 102. The files in the second group may be marked for deletion based on the priorities. For example, files in the second group may be categorized based on dependency, tags, and file properties. Deletion priorities are set for the files in group 2 based on the deletion priority rules.

The following describes file deletion based on cost minimization or optimization.

The cost minimization problem may be formulated as follows:

Given: a set of m files $F=\{f_i, i=1 \ldots m\}$ and the free space threshold T, where each file $f_i$ has size $s_i$, estimated need $n_i$, and estimated cost of recovery $c_i$ (where $c_i$ may be dependent on $s_i$), and T is the minimum amount of space that must be made free, Find decision variables $r_i=0, 1$ for $i=1 \ldots m$ If $r_i=1$, it will delete $f_i$. If $r_i=0$, it will not delete $f_i$.

Minimize objective function: $\Sigma_{i=1 \ldots m} r_i \times n_i \times c_i$

Subject to constraint $\Sigma_{i=1 \ldots m} r_i \times s_i >= T$

Once $n_i$, $s_i$, $c_i$ and T are known, existing mathematical programming methods can be used to solve for all $r_i$ where $i=1 \ldots m$.

Estimated need $n_i$ of a file can be determined as follows in one embodiment of the present disclosure:

Need of a file may be defined as a probability that the file will be needed in the next d period of time (e.g., the next 30 days). The probability may be estimated in distinct or combinations of ways, e.g., based on one or more of file type or extension (e.g., ".log", ".tmp", ".conf"), location of file (e.g., in "/tmp" folder), version of file (e.g., XYZFinalReport v1, XYZFinalReport v1.1, XYZFinalReport v2), date in filename (e.g., ABCReport 2015-02-03, ABCReport 2015-03-14), last accessed time, last modified time, file dependencies.

In one embodiment of the present disclosure, an Estimated cost $c_i$ to recover a file may be defined based on the time delay to restore file to normal location and business cost of delayed restoration. The cost $c_i$ to recover a file may be estimated in distinct or combinations of ways, e.g., time to locate and restore backup file, network traffic incurred by restore operation, and file compression/decompression costs.

The following describes cost minimization example. Consider two files:
au93.tmp has size of 3.5 MB and a last modified date of 2015-04-24;
uwraic.log has size of 1.4 MB and a last modified date of 2015-02-13.
An estimated need or the probability that the file will be needed within the next 30 days may be computed as follows: The estimated need is determined by file type factor and last modified date factor. The au93.tpm file has the "tmp" file type, which has a factor of 0.02; its last modified factor is 0.3. The last modified factor may be determined based on how recently the file was last modified. The estimated need may be computed by multiplying the filetype factor and the last modified factor. In this example, the estimated need $n_i$ is determined to be 0.006.
Similarly, the uwraic.log file has the "log" file type, which has a factor of 0.1; its last modified factor is 0.1. The estimated need may be computed by multiplying the filetype factor and the last modified factor. In this example, the estimated need $n_2$ is determined to be 0.01.

Estimated cost to recover may be determined as follows. Consider for example, compression cost of 7.4/megabyte (MB) and traffic cost of 44/MB, resulting in total units of 51.4/MB. This assumes that the computation cost of compressing a file and later decompressing a file is 7.4 per MB. Similarly, in this example, the cost of transporting the data to its backup location and transporting it back for recovery is 44 per MB. The estimated cost may be determined as a product of the total units of 51.4 and the file size.

$$c_1=51.4\times3.5=180$$

$$c_2=51.4\times1.4=72$$

Potential contribution to an objective function:

$$n_1\times c_1=0.006\times180=1.08$$

$$n_2\times c_2=0.01\times72=0.72$$

In this example, minimization of the objective function will tend to prefer deletion of file 2 (uwraic.log) even though it is older because its filetype is more important and its size makes it cheaper to restore; on the other hand, satisfying the constraint (reaching the threshold T) may require deletion of the larger file (file 1, au93.tmp).

At 116, the marked files are deleted, e.g., if the files have not been already deleted. For instance, the following steps may be performed for file deletion: Calculate total size (S1) of files in the first group, delete all files in the first group. If S1 greater than or to (>=) the free space threshold T, exit. Otherwise, start to delete files in the second group, for example, one by one in a descending deletion priority order until the free space>=the free space threshold T.

In one aspect, the system and/or method of the present disclosure in one embodiment may periodically evaluate files, for example, the new files, new changed files or the files accessed recently, and update the deletion priorities. After update, if the free space is less than the free space threshold, the deletion start may start. In one embodiment, if the free space is greater than the free space threshold, the system and/or method of the present disclosure stops deletion.

The file deletion based on prioritization at 114 may include deleting files based on deletion priority rules. The file deletion based on prioritization in one embodiment considers file dependency that may exist. For example, there may be relationships among files. For instance, file A depends on file B or file A is a dependent of file B. Without file B, file A cannot function or is not usable. If file B gets deleted, file A should be deleted also. As an example, Web page's hypertext markup language (HTML) may link media data, JS, CSS or other HTML files. These artifact files cannot function without the main HTML existence.

In one embodiment, the system and/or method of the present disclosure may periodically evaluate priorities and/or run cost optimization automatically to identify files to delete. The system and/or method of the present disclosure may also evaluate priorities and/or run cost optimization to provide the estimates for deletion options based on a user request, for example, and assist user or a system administrator to make decisions in maintaining storage memory space in a computer system or device. The system and/or method of the present disclosure may allow a system administrator or a user to manipulate priority options ("what if" selections) to learn and make changes on priority rules. The system and/or method of the present disclosure may allow to compress files in local server or the like to free up disk space. This compressing and/or decompressing in a local server incurs less cost compared to deleting and retrieving the data from a remote server. The system and/or method of the present disclosure may also compress or move the data files to remote servers to store. In one embodiment, this cost may be added to the optimization process.

Figure 2:
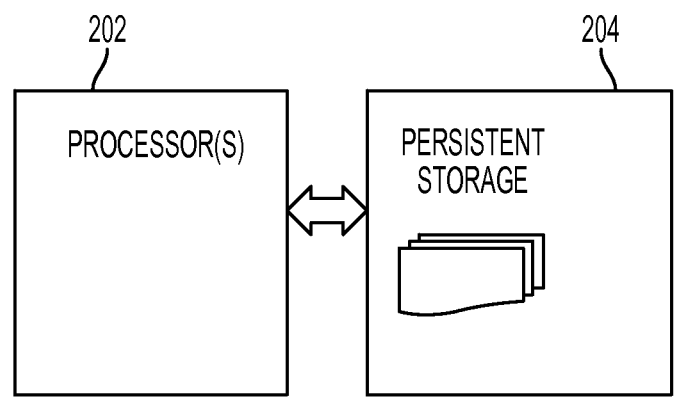
FIG. 2 is a diagram illustrating system architecture in one embodiment of the present disclosure.
Figure 3:
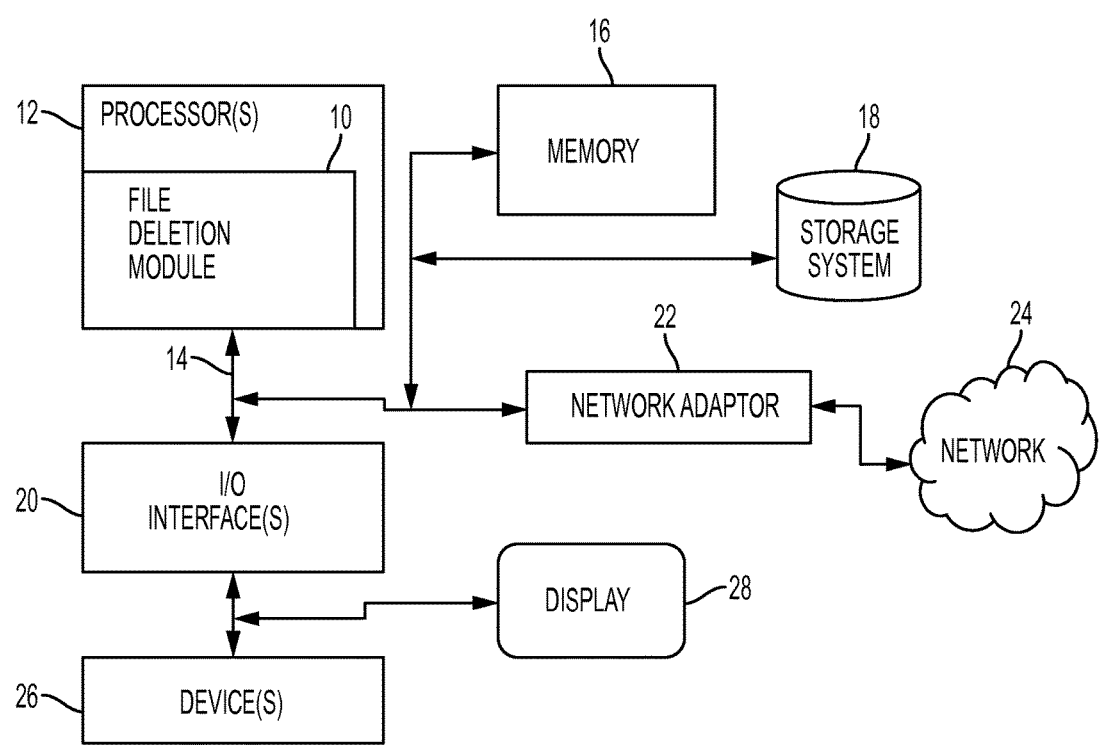
FIG. 3 illustrates a schematic of an example computer or processing system that may implement a file deletion system in one embodiment of the present disclosure.

FIG. 2 is a diagram illustrating system architecture in one embodiment of the present disclosure. One or more processors 202 may be coupled to a storage device 204, e.g., a persistent memory device. An example of a processor shown at 202 may include a central processing unit or another processor, for example, as shown in FIG. 3. An example of a storage device 204 may include a hard disk, and any other storage device or persistent memory device, for example, described with reference to FIG. 3 below. One or more processors 202 and a storage device 204 may be components of a computer system or server, a mobile device or another device. In one aspect, the files to delete may be associated with the entire system or device. In another aspect, the files to delete may be associated with a particular application program running or deployed on the computer system or server or a mobile device or another device.

In one embodiment, one or more of the processors 202 identify files stored in the storage device 204 to delete based on one or more deletion rules. One or more of the processors 202 may categorize the identified files into at least a first group and a second group. One or more of the processors 202 may trigger deletion of files based on a free space threshold. In one embodiment, deletion of files may be triggered by triggering deletion of files in the first group, and determining whether the free space threshold is met by deleting the files in the first group. If the free space threshold is not met by deleting the files in the first group, one or more of the processors 202 in one embodiment triggers deletion of files in the second group based on one or more of prioritization and cost optimization, for example, as described above with reference to FIG. 1.

In one aspect, the highest deletion priority is set to the files in the first group. In one aspect, the free space threshold is configurable and is based on one or more of a computer device coupled to the storage device, size of a random access memory (RAM) associated with the computer device. One or more of the processors 202 may perform identifying the files to delete and triggering the deletion automatically and periodically. In another aspect, one or more of the processors 202 may perform periodically, marking of the files in the second group for deletion based on one or more of the prioritization and cost optimization.

FIG. 3 illustrates a schematic of an example computer or processing system that may implement a file deletion system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of deleting files, comprising executing on one or more processors the steps of:
    identifying files stored in a storage device to delete based on one or more deletion rules;
    categorizing the identified files into at least a first group and a second group;
    triggering deletion of files based on a free space threshold, wherein the triggering deletion of files comprises:
        deleting the files in the first group;
        determining whether the free space threshold is met by deleting the files in the first group;
        responsive to determining that the free space threshold is not met by deleting the files in the first group, triggering deletion of files in the second group based on at least a cost optimization, wherein the cost optimization comprises solving an objective function subject to a constraint, the objective function comprising minimizing a sum, over the files in the second group, of a product of a decision variable of whether a file in the second group is deleted or not deleted, a cost for recovery of the file in the second group, and a probability that the file in the second group will be needed within a predetermined time period, and the constraint comprising a sum, over the files in the second group, of a product of the decision variable of whether the file in the second group is deleted or not deleted and the file's size of the file in the second group is greater than or equal to the free space threshold, and marking the files in the second group indicated by the decision variable for deletion.

2. The method of claim 1, further comprising:
setting a highest deletion priority to the files in the first group.

3. The method of claim 1, wherein the triggering deletion of files comprises deleting all files marked for deletion in a batch mode.

4. The method of claim 1, wherein the free space threshold is configurable based on one or more of a computer device coupled to the storage device, size of a random access memory (RAM) associated with the computer device, size of the storage device, one or more applications deployed on the computer device.

5. The method of claim 1, further comprising determining a prioritization for deleting files in the second group based on one or more of file type, last date modified, file size, file dependency, number of file copies, and number of file versions.

6. The method of claim 1, wherein the method is performed automatically and periodically.

7. The method of claim 1, further comprising periodically marking the files in the second group for deletion based on one or more of the prioritization and cost optimization.

8. A system for deleting files, comprising:
a storage device; and
one or more processors operable to identify files stored in the storage device to delete based on one or more deletion rules,
one or more of the processors further operable to categorize the identified files into at least a first group and a second group;
one or more of the processors further operable to trigger deletion of files based on a free space threshold, wherein one or more of the processors triggers deletion of files by deleting the files in the first group, determining whether the free space threshold is met by deleting the files in the first group, and responsive to determining that the free space threshold is not met by deleting the files in the first group, triggering deletion of files in the second group based on at least a cost optimization, wherein one or more of the processors determines the cost optimization by solving an objective function subject to a constraint, the objective function comprising minimizing a sum, over the files in the second group, of a product of a decision variable of whether a file in the second group is deleted or not deleted, a cost for recovery of the file in the second group, and a probability that the file in the second group will be needed within a predetermined time period, and the constraint comprising a sum, over the files in the second group, of a product of the decision variable of whether the file in the second group is deleted or not deleted and the file's size of the file in the second group is greater than or equal to the free space threshold, and marking the files in the second group indicated by the decision variable for deletion.

9. The system of claim 8, wherein one or more of the processors sets a highest deletion priority to the files in the first group.

10. The system of claim 8, wherein the free space threshold is configurable and is based on one or more of a computer device coupled to the storage device, size of a random access memory (RAM) associated with the computer device, size of the storage device, one or more applications deployed on the computer device.

11. The system of claim 8, wherein one or more of the processors determines a prioritization for deleting files in the second group based on one or more of file type, last date modified, file size, file dependency, number of file copies, and number of file versions.

12. A non-transitory computer readable storage medium storing a program of instructions executable by a machine to perform a method of deleting files, the method comprising:
identifying files stored in a storage device to delete based on one or more deletion rules;
categorizing the identified files into at least a first group and a second group;
triggering deletion of files based on a free space threshold, wherein the triggering deletion of files comprises:
deleting the files in the first group;
determining whether the free space threshold is met by deleting the files in the first group;
responsive to determining that the free space threshold is not met by deleting the files in the first group, triggering deletion of files in the second group based on at least a cost optimization, wherein the cost optimization comprises solving an objective function subject to a constraint, the objective function comprising minimizing a sum, over the files in the second group, of a product of a decision variable of whether a file in the second group is deleted or not deleted, a cost for recovery of the file in the second group, and a probability that the file in the second group will be needed within a predetermined time period, and the constraint comprising a sum, over the files in the second group, of a product of the decision variable of whether the file in the second group is deleted or not deleted and the file's size of the file in the second group is greater than or equal to the free space threshold, and marking the files in the second group indicated by the decision variable for deletion.

13. The non-transitory computer readable storage medium of claim 12, wherein the method further comprises setting a highest deletion priority to the files in the first group.

14. The non-transitory computer readable storage medium of claim 12, wherein the method further comprises determining a prioritization for deleting files in the second group based on one or more of file type, last date modified, file size, file dependency, number of file copies, and number of file versions.

15. The non-transitory computer readable storage medium of claim 12, wherein the method is performed automatically and periodically.

16. The non-transitory computer readable storage medium of claim 12, wherein the method further comprises periodically marking the files in the second group for deletion based on one or more of the prioritization and cost optimization.

* * * * *